United States Patent
Kataoka

(10) Patent No.: US 6,515,575 B1
(45) Date of Patent: Feb. 4, 2003

(54) METHOD OF AUTHENTICATING USER AND SYSTEM FOR AUTHENTICATING USER

(75) Inventor: Kenji Kataoka, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/333,926

(22) Filed: Jun. 16, 1999

(30) Foreign Application Priority Data

Jun. 16, 1998 (JP) .......................................... 10-167928

(51) Int. Cl.[7] .......................... G05B 19/00; G06F 7/00; G08B 29/00; H04B 1/00; H04Q 9/00
(52) U.S. Cl. .................. 340/5.8; 340/5.54; 340/825.29; 340/5.1; 340/5.2; 370/338; 370/230; 370/431; 341/22; 713/200; 713/202
(58) Field of Search ................................ 340/5.54, 5.8, 340/5.81, 5.82, 5.85, 5.86, 825.29, 5.1, 5.2, 5.21, 5.22, 5.28, 5.3

(56) References Cited

U.S. PATENT DOCUMENTS

| | | | | | |
|---|---|---|---|---|---|
| 5,131,038 | A | * | 7/1992 | Puhl et al. ..................... | 380/23 |
| 5,613,214 | A | * | 3/1997 | Shirasawa et al. .......... | 455/54.1 |
| 5,867,106 | A | * | 2/1999 | Bi et al. ................ | 340/825.31 |
| 5,890,520 | A | * | 4/1999 | Johnson, Jr. .................. | 141/94 |
| 6,078,888 | A | * | 6/2000 | Johnson, Jr. ................... | 705/1 |
| 6,263,319 | B1 | * | 7/2001 | Leatherman ................ | 705/30 |
| 6,282,183 | B1 | * | 8/2001 | Harris et al. ................ | 370/338 |
| 6,331,972 | B1 | * | 12/2001 | Harris et al. ................ | 370/313 |
| 6,359,557 | B2 | * | 3/2002 | Bilder ......................... | 340/531 |

FOREIGN PATENT DOCUMENTS

| | | |
|---|---|---|
| GB | WO 97/39553 A1 | 10/1997 |
| GB | 2 335 519 A | 9/1999 |
| JP | 1-180060 | 7/1989 |
| JP | 1-234959 | 9/1989 |
| JP | 1-237750 | 9/1989 |
| JP | 3-71256 | 3/1991 |
| JP | 4-233341 | 8/1992 |
| JP | 4-306760 | 10/1992 |
| JP | 6-332860 | 12/1994 |
| JP | 9-93367 | 4/1997 |
| JP | 9-187081 | 7/1997 |
| JP | 10-41936 | 2/1998 |
| WO | WO 98/07249 A1 | 2/1998 |

OTHER PUBLICATIONS

British Search Report dated Dec. 3, 1999.
Japanese Office Action with partial translation dated Oct. 26, 2001.

* cited by examiner

*Primary Examiner*—Michael Horabik
*Assistant Examiner*—Nam V Nguyen
(74) *Attorney, Agent, or Firm*—McGinn & Gibb, PLLC

(57) ABSTRACT

There is provided a method of authenticating a portable data-communication terminal user in a system comprising a portable data-communication terminal and a device for authenticating a user both including a transceiver for making radio-communication to each other, the method including the steps of (a) transmitting and receiving user-authentication data between the portable data-communication terminal and the user-authenticating device to thereby carry out check as to whether the portable data-communication terminal is far away from the user-authenticating device by a distance equal to or smaller than a first distance within which the transceiver can make radio-communication between the portable data-communication terminal and the user-authenticating device, and (b) allowing the portable data-communication terminal to carry out a predetermined operation only when the portable data-communication terminal is authenticated to be located within the first distance from the user-authenticating device. In accordance with the method, only when an authorized user having both the portable data-communication terminal and the user-authenticating device uses the portable data-communication terminal, the portable data-communication terminal is allowed to carry out a certain operation. Hence, it is possible to prevent a third party from using the portable data-communication terminal without permission of the user.

20 Claims, 5 Drawing Sheets

METHOD OF AUTHENTICATING USER AND SYSTEM FOR AUTHENTICATING USER

BACKGROUND OF THE INVENTION

1. Field of the Invention

The invention relates to a method of authenticating a user and a system of authenticating a user both to be used for a portable data-communication terminal.

2. Description of the Related Art

When a conventional data-communication terminal is to log in to a host computer, the host computer usually requests the data-communication terminal to transmit an account name used for identifying a user and a pass word used for authenticating a user, as data for judging whether log-in is allowed.

Such data-communication terminals have been suggested in Japanese Unexamined Patent Publications Nos. 4-233341 and 9-187081.

FIG. 1 is a block diagram of one of conventional data-communication terminals which log in to a host computer.

When a data-communication terminal 20 logs in to a host computer 30, a user inputs a request for log-in to the data-communication terminal 20 through an input section 320. When a request for log-in is input through the input section 320, an access controller 210 of the data-communication terminal 20 transmits a request for communication to the host computer 30 through a communication controller 310.

When requested to show an account name and a password from the host computer 30, the access controller 210 informs a user of such a request through a display screen 220 of the data-communication terminal 20. A user informed of such a request inputs an account name and a password as log-in data 40 through the input section 320. The thus input log-in data 40 is transmitted to the host computer 30, and log-in of the data-communication terminal 20 to the host computer 30 is carried out, for instance, when the pass word as log-in data is coincident with a pass word stored in the host computer 30.

Though an input of log-in data was carried out in a user's office in a conventional non-portable data-communication terminal, as a portable data-communication terminal has been widely used, an input of log-in data is often carried out outside a user's office. However, in accordance with the conventional method as illustrated in FIG. 1, an input of log-in data may be furtively looked at by a third party.

In addition, a data-communication terminal designed to be portable would have much possibility of being stolen or lost, which was not found in the conventional non-portable data-communication terminal.

SUMMARY OF THE INVENTION

In view of the above-mentioned problems of the conventional data-communication terminal, it is an object of the present invention to provide a method of authenticating a user and a system of doing the same both of which are capable of preventing a third party from using a portable data-communication terminal without user's permission.

In one aspect, there is provided a method of authenticating a portable data-communication terminal user in a system including a portable data-communication terminal and a device for authenticating a user both including a transceiver for making radio-communication to each other, the method including the steps of (a) transmitting and receiving user-authentication data between the portable data-communication terminal and the user-authenticating device to thereby carry out check as to whether the portable data-communication terminal is far away from the user-authenticating device by a distance equal to or smaller than a first distance within which the transceiver can make radio-communication between the portable data-communication terminal and the user-authenticating device, and (b) allowing the portable data-communication terminal to carry out a predetermined operation only when the portable data-communication terminal is authenticated to be located within the first distance from the user-authenticating device.

It is preferable that the user-authentication data is code data inherent to a user, and that the check is carried out by checking whether user-authentication data of the portable data-communication terminal is coincident with user-authentication data of the user-authenticating device.

It is preferable that the portable data-communication terminal has a function of logging in a host device by transmitting log-in data to the host device, and whether log-in of the portable data-communication terminal to the host device is allowed is determined in accordance with a result of the check.

It is preferable that the log-in data is stored in advance in a memory equipped in the portable data-communication terminal, and the log-in data is read out of the memory, and transmitted to the host device.

For instance, the log-in data may be comprised of first data including an account, used for identifying a user, and second data including a password, used for authenticating a user.

It is preferable that the check is carried out only when a predetermined request is input into the portable data-communication terminal.

It is preferable that after the check has been carried out once, the check is repeatedly carried out in a fixed interval.

It is preferable that the portable data-communication terminal transmits an authentication requesting signal including data about random number to the user-authenticating device, the user-authenticating device receiving the authenticating requesting signal produces a response signal including the data about random number and authentication data stored in the user-authenticating device, and transmits the thus produced response signal to the portable data-communication terminal, and the portable data-communication terminal receiving the response signal extracts the authentication data from the response signal, and compares the thus extracted authentication data with authentication data stored in the portable data-communication terminal.

In another aspect of the present invention, there is provided a system for authenticating a user, including (a) a portable terminal which makes data-communication including a memory to store authentication data of itself therein, and a radio-transceiver to make radio-communication for transmitting and receiving the authentication data, and (b) a device which authenticates a user including a memory to store authentication data of itself therein, and a radio-transceiver to make radio-communication for transmitting and receiving the authentication data, the portable data-communication terminal and the user-authenticating device transmitting and receiving the authentication data therebetween to thereby carry out check as to whether the portable data-communication terminal is far away from the user-authenticating device by a distance equal to or smaller than a first distance within which the radio-transceivers can make radio-communication between the portable data-communication terminal and the user-authenticating device, the portable data-communication terminal being allowed to carry out a predetermined operation only when the portable data-communication terminal is authenticated to be located within the first distance from the user-authenticating device.

It is preferable that the user-authenticating device includes a radio-transmitter to transmit authentication data of itself to the portable data-communication terminal in radio, and that the portable data-communication terminal includes a radio-receiver to receive the authentication data transmitted from the user-authenticating device, and a comparator to compare the thus received authentication data to authentication data of the portable data-communication terminal.

It is preferable that the portable data-communication terminal includes a radio-transmitter to transmit a request for authentication to the user-authenticating device in radio, and that the user-authenticating device includes a radio-receiver to receive the request transmitted from the portable data-communication terminal.

It is preferable that the portable data-communication terminal includes a timer which monitors whether authentication data is received from the user-authenticating device within a predetermined period of time after the request has been transmitted to the user-authenticating device.

It is preferable that the portable data-communication terminal has a function of logging in a host device by transmitting log-in data to the host device, and includes a memory storing the log-in data therein, and an access controller transmitting the log-in data to the host device.

It is preferable that the portable data-communication terminal includes (a) a random number generator, (b) a comparative data producer which produces comparative data, based on the authentication data received from the memory and a random number transmitted from the random number, and transmits the thus produced comparative data to the comparator.

It is preferable that the portable data-communication terminal includes a second timer measuring a certain period of time after the portable data-communication terminal has been allowed to log in to the host device, the check being carried out in every the certain period of time. For instance, the certain period of time may be variable.

It is preferable that the radio-transmitter of the user-authentication device transmits a variable output for making radio-communication with the portable data-communication terminal.

It is preferable that the radio-transmitter of the portable data-communication terminal transmits a variable output for making radio-communication with the user-authentication device.

In the above-mentioned present invention, the portable data-communication terminal and the user-authenticating device are used as a pair, and include means for making radio-communication to each other, that is, a transceiver. The portable data-communication terminal and the user-authenticating device store authentication data therein, and it is checked whether the portable data-communication terminal and the user-authenticating device are located within a distance within which the transceivers can make radio-communication between the portable data-communication terminal and the user-authenticating device, by transmitting and receiving the authentication data between the portable data-communication terminal and the user-authenticating device.

Only when it is recognized that the portable data-communication terminal and the user-authenticating device are located within the above-mentioned distance, the portable data-communication terminal is allowed to carry out a predetermined operation, for instance, an operation of logging in to a host computer.

When it is not recognized that the portable data-communication terminal and the user-authenticating device are located within the above-mentioned distance, it is judged that the portable data-communication terminal may be illegally used by a third party far from the user-authenticating device, and as a result, the portable data-communication terminal is prohibited to carry out any operation. Hence, it is possible to prevent a third party from using the portable data-communication terminal without user's permission.

The above and other objects and advantageous features of the present invention will be made apparent from the following description made with reference to the accompanying drawings, in which like reference characters designate the same or similar parts throughout the drawings.

DESCRIPTION OF THE PREFERRED EMBODIMENTS

Figure 1:
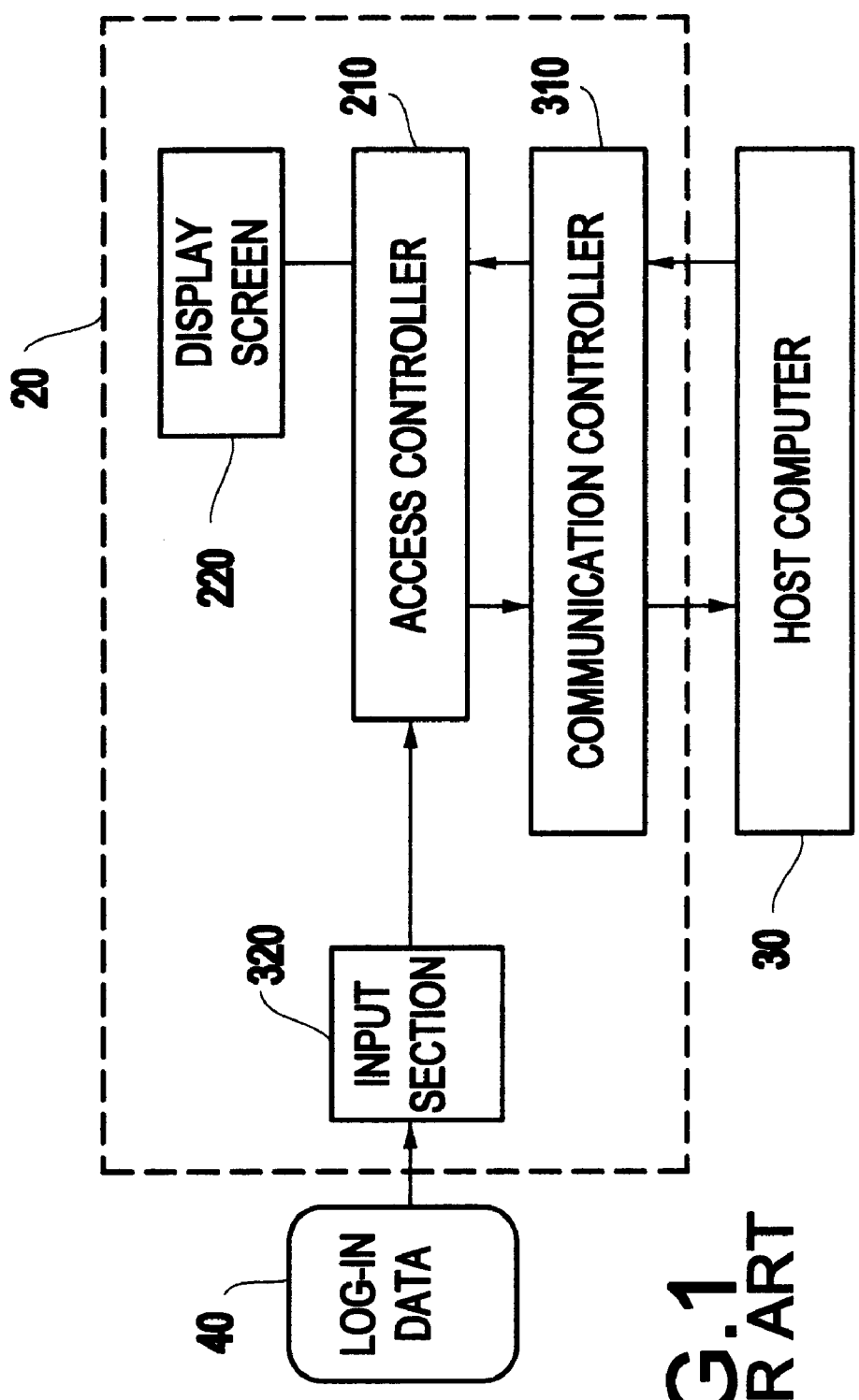
FIG. 1 is a block diagram of a conventional system comprised of a data-communication terminal and a host computer.
Figure 2:
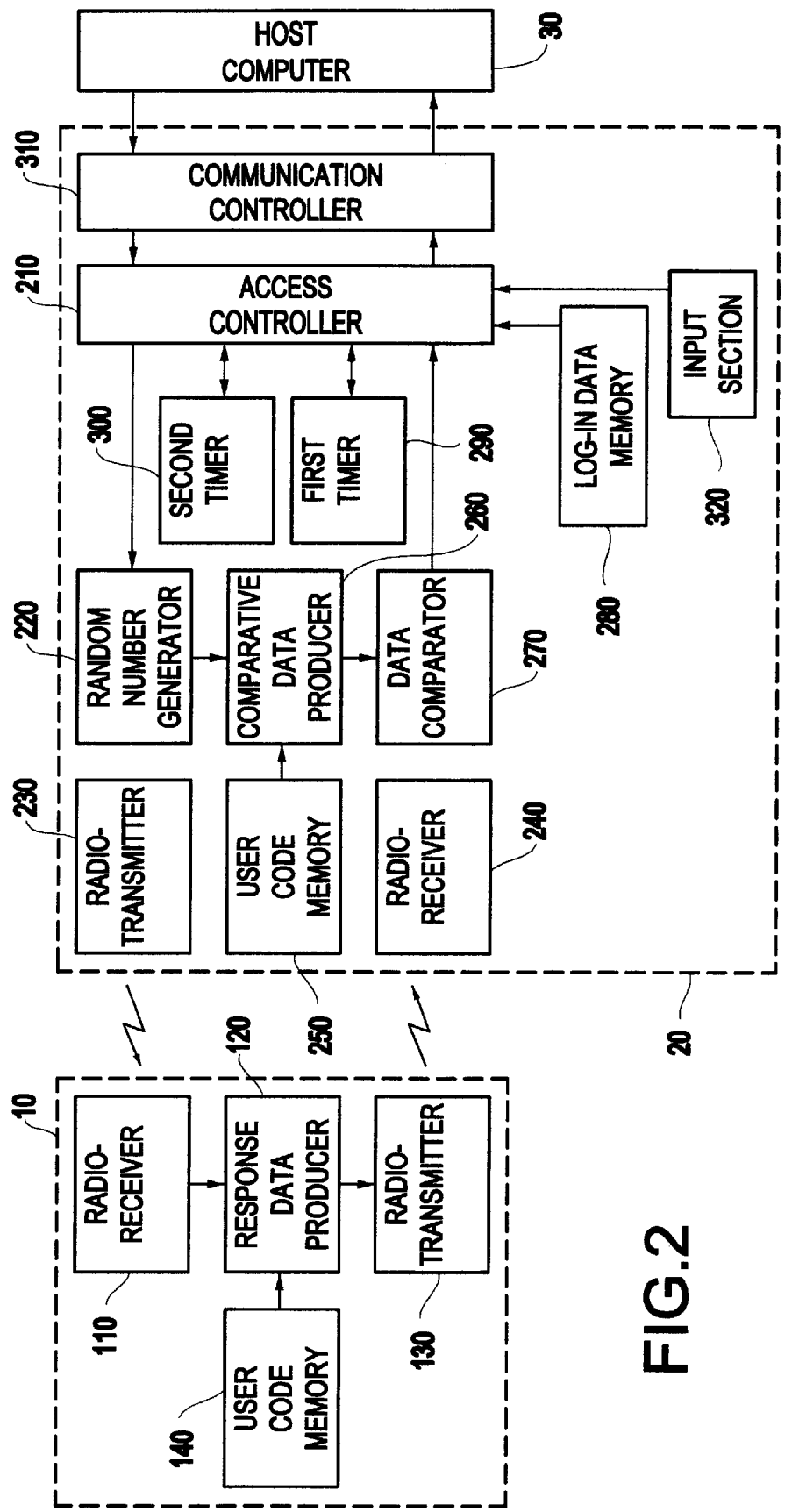
FIG. 2 is a block diagram of a system of authenticating a user, in accordance with a preferred embodiment of the present invention.

FIG. 2 is a block diagram of the system of authenticating a user, in accordance with the embodiment of the present invention.

As illustrated in FIG. 2, the system of authenticating a user, in accordance with the embodiment, employs a user-authenticating device 10 and a portable data-communication terminal 20 as a pair. The user-authenticating device 10 and the portable data-communication terminal 20 make radio-communication therebetween, for instance, for transmitting a log-in request from a user, or for accomplishing time management every certain period of time by means of a timer, to thereby check whether they are within a distance within which they can make radio-communication. When it is judged that the user-authenticating device 10 and the portable data-communication terminal 20 are within such a distance, it is considered that the portable data-communication terminal 20 is legally used. Only when the portable data-communication terminal 20 is judged to be legally used, the portable data-communication terminal 20 is allowed to make access to a host computer 30.

The user-authenticating device 10 is comprised of a radio-receiver 110, a response data producer 120, a radio-transmitter 130, and a user code memory 140.

The radio-receiver 110 receives a signal for requesting carrying out authentication, transmitted from the portable data-communication terminal 20, extracts random number data out of the thus received authentication requesting signal, and transmits the thus extracted random number data to the response data producer 120.

The user code memory 140 stores a user code of the user-authenticating device 10, and transmits the user code to the response data producer 120.

The response data producer 120 produces response data, based on the random number data transmitted from the radio-receiver 110 and the user code transmitted from the user code memory 140, and transmits the thus produced response data to the radio-transmitter 130.

The radio-transmitter 130 produces an authentication response signal, based on the response data transmitted from the response data producer 120, and transmits the thus produced authentication response signal to the portable data-communication terminal 20 in radio.

The portable data-communication terminal 20 is comprised of an access controller 210, a random number generator 220, a radio-transmitter 230, a radio-receiver 240, a user code memory 250, a comparative data producer 260, a data comparator 270, a log-in data memory 280, a first timer 290, a second timer 300, a communication controller 310, and an input section 320.

The access controller 210 controls log-in and log-out operations to the host computer 30 in response to a log-in request input through the input section 320.

The communication controller 310 controls actual communication to the host computer 30.

The random number generator 220 generates random number on receipt an instruction transmitted from the access controller 210, and transmits the thus generated random number to the radio-transmitter 230 and the comparative data producer 260.

The radio-transmitter 230 produces an authentication requesting signal, based on the random number transmitted from the random number generator 220, and transmits the authentication requesting signal to the user-authenticating device 10 in radio.

The radio-receiver 240 receives the authentication response signal transmitted from the user-authenticating device 10, extracts the response data out of the received authentication response signal, and transmits the thus extracted response data to the data comparator 270.

The user code memory 250 stores the same user code as the user code stored in the user-authenticating device 10. The user code memory 250 transmits the user code to the comparative data producer 260.

The comparative data producer 260 produces comparative data, based on the random number transmitted from the random number generator 220 and the user code transmitted from the user code memory 250, and transmits the thus produced comparative data to the data comparator 270.

The data comparator 270 compares the comparative data transmitted from the comparative data producer 260 to the response data transmitted from the radio-receiver 240, and transmits a result of the comparison to the access controller 210.

The second timer 300 starts time-counting immediately after the access controller 210 has provided an instruction to the random number generator 220. When the authentication response signal is not received after the lapse of a certain period of time, the second timer 300 informs the access controller 210 of time-out.

The log-in data memory 280 stores data necessary for the portable data-communication terminal to log in to the host computer 30, and transmits the log-in data to the access controller 210 in response to a request transmitted from the access controller 210.

The first timer 290 starts time-counting just after log-in of the portable data-communication terminal 20 to the host computer 30 has been approved, and counts a certain period of time, in which a user-authenticating operation having been carried out when log-in of the portable data-communication terminal 20 to the host computer 30 has been approved is carried out. When time is out, that is, when a user is not authenticated in such a certain period of time, the first timer 290 informs the access controller 210 of time-out.

In response, the access controller 210 receives a result of the comparison from the data comparator 270. If the result shows that the comparative data is coincident with the response data, the access controller 210 reads information necessary for the portable data-communication terminal 20 to log in to the host computer 30, out of the log-in data memory 280, and transmits the thus read out log-in data to the communication controller 310. As a result, the portable data-communication terminal 20 is logged in to the host computer 30.

When the result shows that that the comparative data is not coincident with the response data, or when the second timer 300 informs the access controller 210 of time-out, the access controller 210 judges that a user is not authenticated, and transmits a request for disconnection to the communication controller 310. Then, a connection to the host computer 30 is interrupted.

An interval in which a user authentication is carried out by means of the first timer 290 may be determined to be a desired one. For instance, the interval may be set equal to about 10 seconds in order to avoid a risk that others use the portable data-communication terminal 20 while a user having the user-authenticating device 10 is away from the portable data-communication terminal 20. However, since such a risk is dependent on users, the interval may be set equal to about 1 minute, if such a risk is relatively low.

The interval may be designed to be able to be varied through a certain operation carried out by a user.

A distance within which the radio-transmitters 130 and 230 and the radio-receivers 110 and 240 can make radio-communication therebetween is dependent on user's circumstance. For instance, such a distance may be set in the range of a couple of meters to tens of meters.

The radio-transmitter 130 of the user-authenticating device 10 may be designed to be able to transmit a variable output so that a user can select a desired output. As an alternative, the radio-transmitter 230 of the portable data-communication terminal 20 may be designed in the same manner.

A signal format in data-communication to be carried out in the instant embodiment is in accordance with standard specification (RCRSTD-27, 28) such as standard specification for a PDC type cellular phone and personal handy phone system (PHS). However, it should be noted that various signal formats may be used in dependence on infrastructure of an area in which the system in accordance with the instant embodiment is employed.

A longer user code would ensure higher security. In the system of authenticating a user, a user code is not allowed to overlap other user codes. However, a user code which is too long would take much time for calculation. Hence, a user code is preferably designed to have a length sufficient to avoid overlapping other user codes even if the portable data-communication terminal 20 is widely used. For instance, a user code may be designed to have 64 digits in binary numeral.

The user code memories 140 and 250 storing such a user code may be comprised of a read only memory (ROM).

A process of authenticating data in the instant system is explained hereinbelow with reference to FIGS. 3 to 5.

Figure 3:
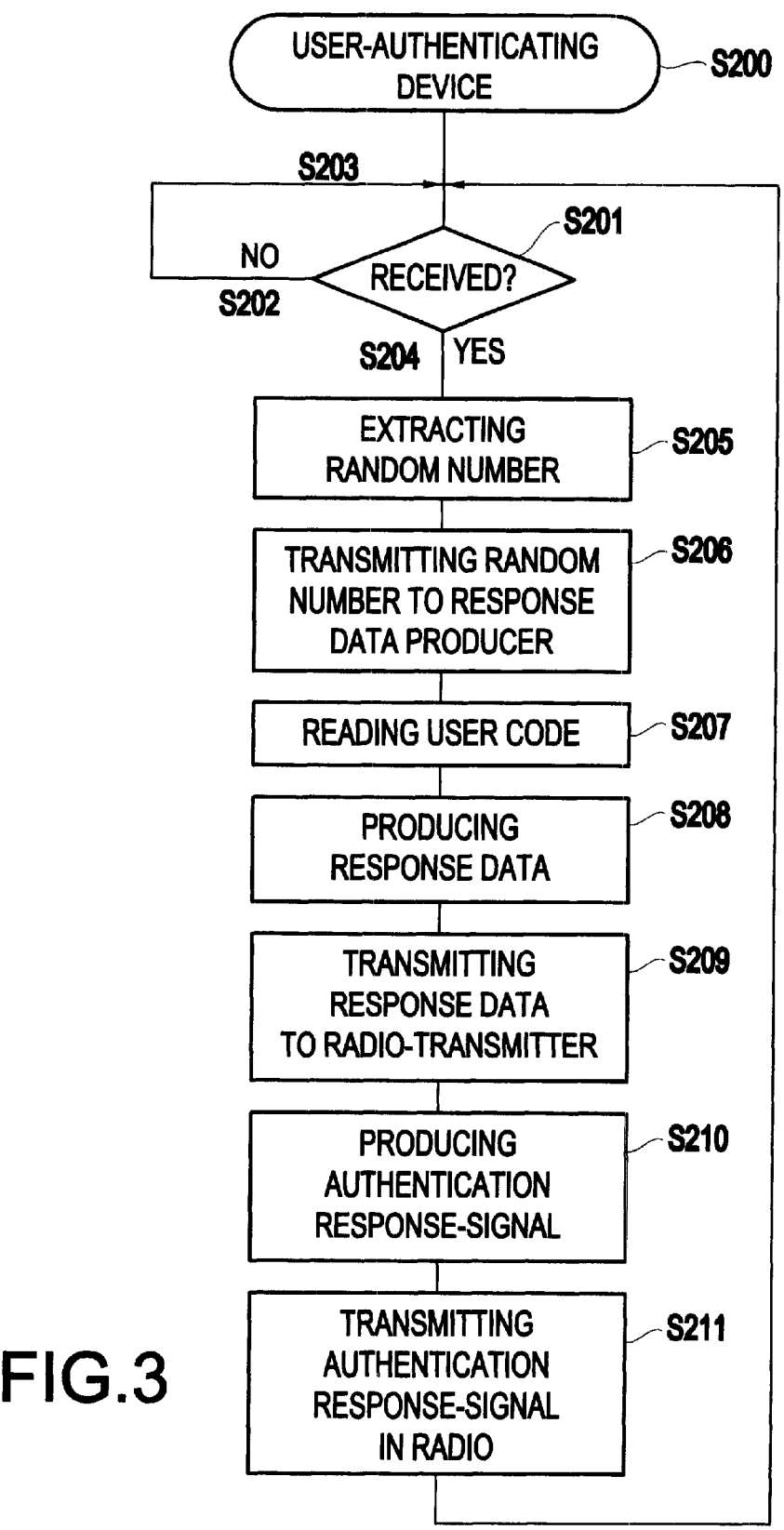
FIG. 3 is a flow chart showing an operation of the user-authenticating device constituting the system illustrated in FIG. 2.
Figure 4:
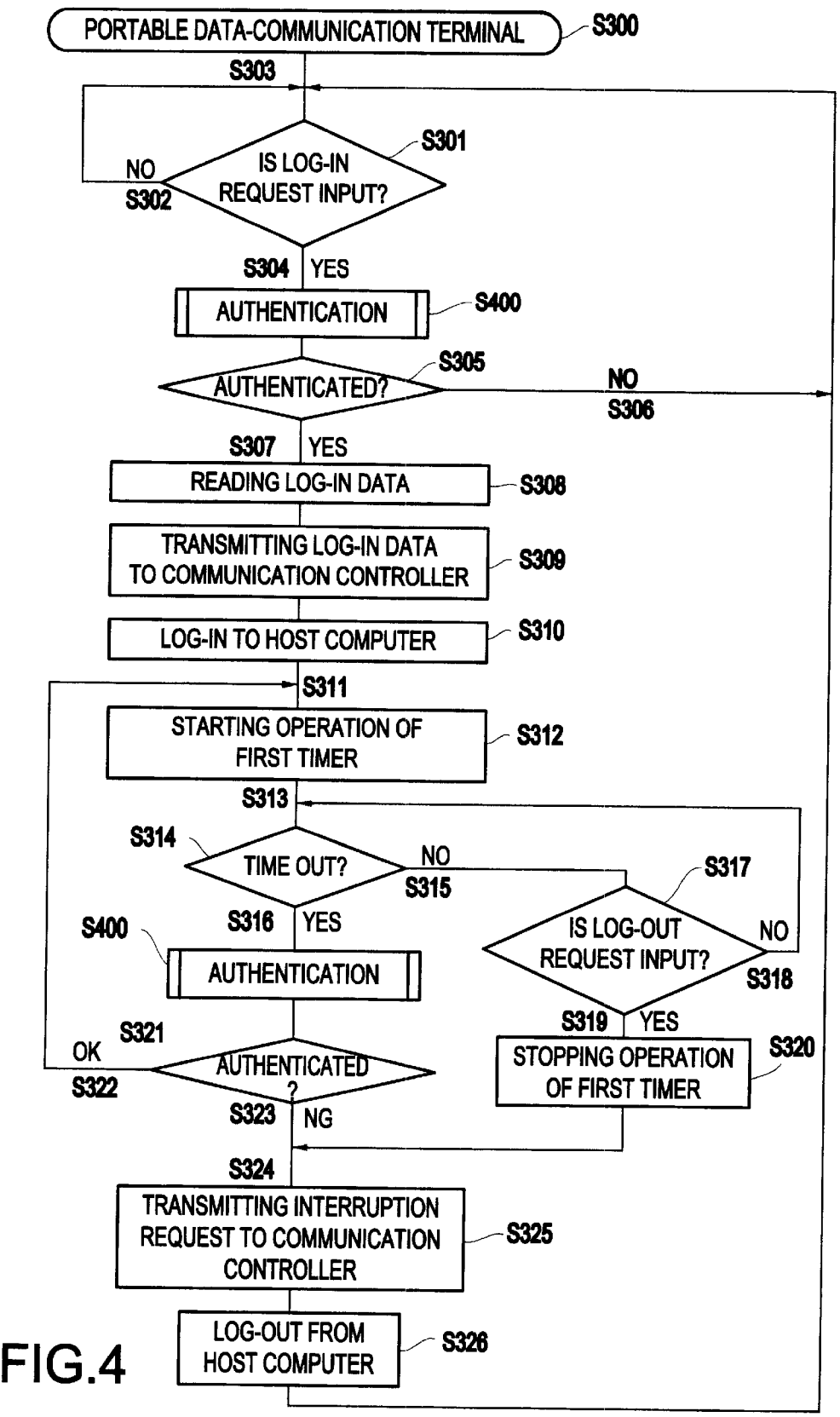
FIG. 4 is a flow chart showing an operation of the portable data-communication terminal constituting the system illustrated in FIG. 2.
Figure 5:
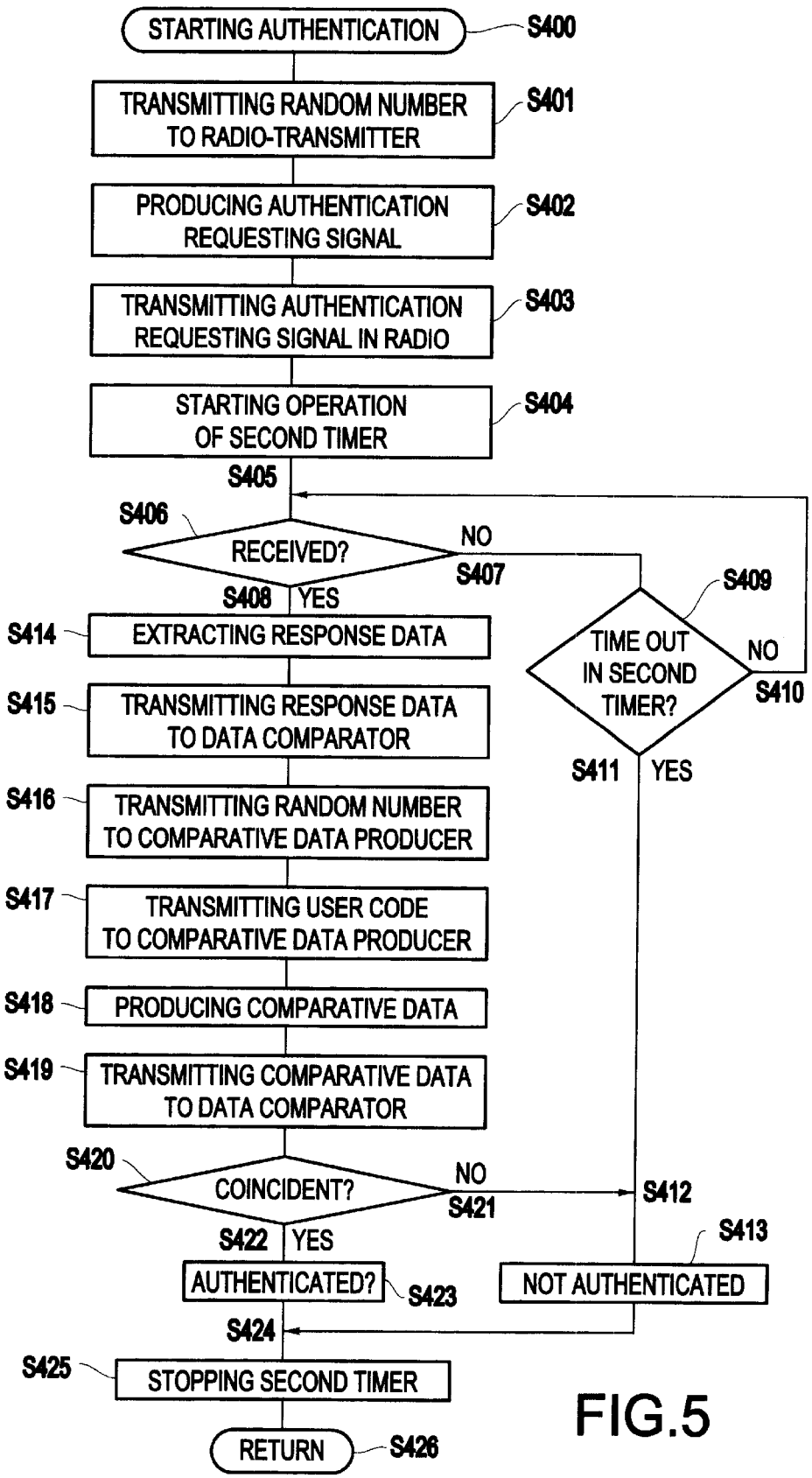
FIG. 5 is a flow chart showing steps of user-authentication to be carried out in the system illustrated in FIG. 2.

FIG. 3 is a flow chart showing an operation of the user-authenticating device 10, FIGS. 4 and 5 are flow charts showing an operation of the portable data-communication terminal 20. In particular, FIG. 4 shows an operation of the access controller 210, and FIG. 5 shows an operation of user authentication to be carried out between the user-authenticating device 10 and the portable data-communication terminal 20.

With reference to FIG. 3, when the user-authenticating device 10 is turned on, the user-authenticating device 10 is in stand-by condition, that is, is waiting for an authentication-requesting signal transmitted from the portable data-communication terminal 20. The radio-receiver 110 checks whether an authentication-requesting signal is received or not in step S201.

If not (S202), the radio-receiver 110 repeats checking whether an authentication-requesting signal is received, in step S203.

If an authentication requesting signal is received (S204), the radio-receiver 110 extracts a random number out of the received authentication requesting signal, in step S205, and transmits the thus extracted random number to the response data producer 120 in step S206.

The response data producer 120 reads a user code out of the user code memory 140 in step S207, produces response data, based on the random number and the thus read-out user code in step S208, and transmits the thus produced response data to the radio-transmitter 130, in step S209.

The radio-transmitter 130 produces an authentication response signal, based on the response data transmitted from the response data producer 120, in step S210, and transmits the thus produced authentication response signal to the portable data-communication terminal 20 in radio, in step S211.

Thereafter, the user-authenticating device 10 is put again into stand-by condition, namely, a condition of waiting for an authentication requesting signal transmitted from the portable data-communication terminal 20, in step S203.

With reference to FIG. 4, when the portable data-communication terminal 20 is turned on, the portable data-communication terminal 20 is in stand-by condition, that is, in a condition of waiting for a log-in request to be input through the input section 320. The access controller 210 checks whether a log-in request is input through the input section 320, in step S301.

If not (step S302), the access controller 210 repeats checking whether a log-in request is input through the input section 320, in step S303.

If a log-in request is input (step S304), the portable data-communication terminal 20 checks whether a user authentication has already been carried out, in step S400, and then, checks a result of the user authentication which was conducted by communication between the user-authenticating device 10 and the portable data-communication terminal 20, in step S305.

The process of carrying out user authentication (step S400) is explained later with reference to FIG. 5.

If a user is not authenticated (S306), the portable data-communication terminal 20 is put again into stand-by condition (S303).

If a user is authenticated (S307), the access controller 210 reads log-in data out of the log-in data memory 280 in step S308, and transmits the log-in data to the communication controller 310 in step S309.

Receiving the log-in data from the access controller 210, the communication controller 310 causes the portable data-communication terminal 20 to log in to the host computer 30, in step S310.

After the portable data-communication terminal 20 has been logged in to the host computer 30, the access controller 210 starts operating the first timer 290, in step S312. Then, the access controller 210 is in a condition of waiting for time-out until next user-authentication is carried out, and checks whether time is out or not in step S314.

If time is not out (S315), the access controller 210 checks whether a log-out request is input through the input section 320 in step S317. If a log-out request is not input (S318), a check as to whether time is out (S314) is carried out again (S313). If a log-out request is input through the input section 320 in step S319, the first timer 290 is stopped to operate, in step S320. Then, the same procedure as the procedure to be carried out when a user is not authenticated is carried out (S324).

When time is out in the first timer 290 in step S316, a user authentication is carried out again in steps 400 and 321.

If a user is authenticated (S322), steps S311 to S321 are repeated.

If a user is not authenticated (S323), the access controller 210 transmits a request of interruption to the communication controller 310, in step S325. The communication controller 310 causes the portable data-communication terminal 20 to be logged out from the host computer 30, in step S326.

Then, the portable data-communication terminal 20 is put again in stand-by condition, that is, in a condition of waiting for a log-in request to be input through the input section 320 (step S303).

The procedure of user authentication is explained hereinbelow with reference to FIG. 5.

First, the access controller 210 instructs the random number generator 220 to generate random number, and then transmit the thus generated random number to the radio-transmitter 230, in step S401.

The radio-transmitter 230 produces an authentication requesting signal, based on the random number transmitted from the random number generator 220, in step S402, and then, transmits the thus produced authentication requesting signal in radio to the radio-receiver 110 of the user-authenticating device 10, in step S403.

After the authentication requesting signal has been transmitted, the access controller 210 starts operating the second timer 300, in step S404, which measures a certain period of time in which the portable data-communication terminal 20 waits for receiving the authentication response signal.

While the portable data-communication terminal 20 is in the stand-by condition, the radio-receiver 240 checks whether an authentication response signal is received or not, in step S406.

If an authentication response signal is not received (S407), the second timer 300 is checked as to whether time is out, in step S409. If time is not out (S410), a check whether an authentication response signal is received or not is repeated (S405).

If an authentication response signal is received (S408), the radio-receiver 240 extracts response data out of the received authentication response signal, in step S414, and transmits the response data to the data comparator 270, in step S415.

The comparative data producer 260 produces comparative data in step S418, based on the random number transmitted from the random number generator 220 (step S416) and the user code read out of the user code memory 250 (S417), and transmits the thus produced comparative data to the data comparator 270, in step S419.

The data comparator 270 compares the response data transmitted from the radio-receiver 240 to the comparative data transmitted from the comparative data producer 260, in step S420. If they are coincident with each other (S422), the data comparator 270 judges that a user is authenticated (S423). If they are not coincident with each other (S421), the data comparator 270 judges that a user is not authenticated (S413).

After user-authentication has been finished, the second timer 300 is stopped in step S425. Thus, the procedure of user-authentication is finished in step S426.

When time is out in the second timer 300 (S411), there is carried out the same procedure as the procedure to be carried out when the comparative data is not coincident with the response data, in step S412.

In accordance with the above-mentioned embodiment, a user is not allowed to make access to the host computer 30, unless he/she has both the user-authenticating device 10 and the portable data-communication terminal 20. Hence, it is possible to prevent a third party from making illegal access to the host computer 30, even if the portable data-communication terminal 20 is stolen or lost.

In addition, since user-authentication can be carried out through radio-communication between the user-authenticating device 10 and the portable data-communication terminal 20, it is not necessary for the user-authenticating device 10 and the portable data-communication terminal 20 to make actual contact with each other. Hence, a user can separately bring one of them with him/her, which ensures less possibility of the portable data-communication terminal 20 being lost or stolen.

Furthermore, since user-authentication is carried out through radio-communication, a user is not authenticated, if the user-authenticating device 10 and the portable data-communication terminal 20 are far away from each other. Hence, even if a user holding the user-authenticating device 10 with him/her is temporarily away from the portable data-communication terminal 20, it would be possible to prevent a third party from making access to the host computer 30 from the portable data-communication terminal 20, ensuring enhancement in security.

In addition, content of radio-communication for carrying out user-authentication is varied each time through the use of random number, which ensures protection from being tapped in radio-communication area.

In the system in accordance with the above-mentioned embodiment, since log-in data stored in the log-in data memory 280 is read out each time user-authentication is carried out, it is no longer necessary for a user to input log-in data each time user-authentication is carried out. Hence, even if the portable data-communication terminal 20 is used outside a user's office to thereby log in to the host computer 30, it would be possible to prevent log-in data from being stolen a glance.

In addition, it is possible to shorten a time necessary for carrying out authentication, and simplify procedure for carrying out authentication.

The above-mentioned embodiment has been explained as an example wherein an operation of log-in of the portable data-communication terminal 20 to the host computer 30 is restricted for being carried out in dependence on a result of user-authentication. However, it should be noted that any other operation may be restricted to be carried out in dependence on the result. While the present invention has been described in connection with certain preferred embodiments, it is to be understood that the subject matter encompassed by way of the present invention is not to be limited to those specific embodiments. On the contrary, it is intended for the subject matter of the invention to include all alternatives, modifications and equivalents as can be included within the spirit and scope of the following claims.

The entire disclosure of Japanese Patent Application No. 10-167928 filed on Jun. 16, 1998 including specification, claims, drawings and summary is incorporated herein by reference in its entirety.

What is claimed is:

1. A method of authenticating a portable data-communication terminal user in a system comprising a host, a portable data-communication terminal and a user authenticating device for authenticating a user, the portable data-communication terminal and said user authenticating device each including a transceiver for making radio-communication to each other, said method comprising:

(a) transmitting and receiving user-authentication data between said portable data-communication terminal and said user-authenticating device to thereby carry out check as to whether said portable data-communication terminal is far away from said user-authenticating device by a distance equal to or smaller than a first distance within which said transceiver can make radio-communication between said portable data-communication terminal and said user-authenticating device; and (b) allowing said portable data-communication terminal to carry out a predetermined operation only when said portable data-communication terminal is authenticated to be located within said first distance from said user-authenticating device.

2. The method as set forth in claim 1, wherein said user-authentication data is code data inherent to a user.

3. The method as set forth in claim 1, wherein said portable data-communication terminal has a function of logging in a host device by transmitting log-in data to said host device, and whether log-in of said portable data-communication terminal to said host device is allowed is determined in accordance with a result of said check.

4. The method as set forth in claim 3, wherein said log-in data is stored in advance in a memory equipped in said portable data-communication terminal, and said log-in data is read out of said memory, and transmitted to said host device.

5. The method as set forth in claim 3, wherein said log-in data is comprised of first data including an account, used for identifying a user, and second data including a pass word, used for authenticating a user.

6. The method as set forth in claim 1, wherein said check is carried out only when a predetermined request is input into said portable data-communication terminal.

7. The method as set forth in claim 6, wherein after said check has been carried out once, said check is repeatedly carried out in a fixed interval.

8. The method as set forth in claim 1, wherein said portable data-communication terminal transmits an authentication requesting signal including data about random number to said user-authenticating device, said user-authenticating device receiving said authenticating requesting signal produces a response signal including said data about random number and authentication data stored in said user-authenticating device, and transmits the thus produced response signal to said portable data-communication terminal, and said portable data-communication terminal receiving said response signal extracts said authentication data from said response signal, and compares the thus extracted authentication data with authentication data stored in said portable data-communication terminal.

9. The method of claim 1, further comprising determining whether said user-authentication data authenticates said user-authenticating device.

10. The method of claim 9, wherein said determining is based upon a comparison of user-authentication data stored by said user-authenticating device and user-authentication data stored on said portable data-communication terminal.

11. A system for authenticating a user, comprising:
(a) a portable terminal which makes data-communication including a memory to store authentication data of itself therein, and a radio-transceiver to make radio-communication for transmitting and receiving said authentication data; and
(b) a device which authenticates a user including a memory to store authentication data of itself therein, and a radio-transceiver to make radio-communication for transmitting and receiving said authentication data, said portable data-communication terminal and said user-authenticating device transmitting and receiving said authentication data therebetween to thereby carry out check as to whether said portable data-communication terminal is far away from said user-authenticating device by a distance equal to or smaller than a first distance within which said radio-transceivers can make radio-communication between said portable data-communication terminal and said user-authenticating device, said portable data-communication terminal being allowed to carry out a communication with a host only when said portable data-communication terminal is authenticated to be located within said first distance from said user-authenticating device.

12. The system as set forth in claim 11, wherein said user-authenticating device includes a radio-transmitter to transmit authentication data of itself to said portable data-communication terminal in radio, and wherein said portable data-communication terminal includes a radio-receiver to receive said authentication data transmitted from said user-authenticating device, and a comparator to compare the thus received authentication data to authentication data of said portable data-communication terminal.

13. The system as set forth in claim 12, wherein said portable data-communication terminal includes a radio-transmitter to transmit a request for authentication to said user-authenticating device in radio, and wherein said user-authenticating device includes a radio-receiver to receive said request transmitted from said portable data-communication terminal.

14. The system as set forth in claim 13, wherein said portable data-communication terminal includes a timer which monitors whether authentication data is received from said user-authenticating device within a predetermined period of time after said request has been transmitted to said user-authenticating device.

15. The system as set forth in claim 12, wherein said radio-transmitter of said portable data-communication terminal transmits a random output for making radio-communication with said user-authentication device.

16. The system as set forth in claim 12, wherein said portable data-communication terminal includes:
(a) a random number generator;
(b) a comparative data producer which produces comparative data, based on said authentication data received from said memory and a random number transmitted from said random number, and transmits the thus produced comparative data to said comparator.

17. The system as set forth in claim 12, wherein said radio-transmitter of said user-authentication device transmits a random output for making radio-communication with said portable data-communication terminal.

18. The system as set forth in claim 11, wherein said portable data-communication terminal has a function of logging in a host device by transmitting log-in data to said host device, and includes a memory storing said long-in data therein, and an access controller transmitting said log-in data to said host device.

19. The system as set forth in claim 18, wherein said portable data-communication terminal includes a second timer measuring a certain period of time after said portable data-communication terminal has been allowed to log in to said host device, said check being carried out in every said certain period of time.

20. The system as set forth in claim 19, wherein said certain period of time is variable.

* * * * *